(No Model.)
C. E. McGLINCHEY & C. W. HEDENBERG.
TUBULAR HUB FOR BICYCLE OR OTHER WHEELS.
No. 549,740. Patented Nov. 12, 1895.
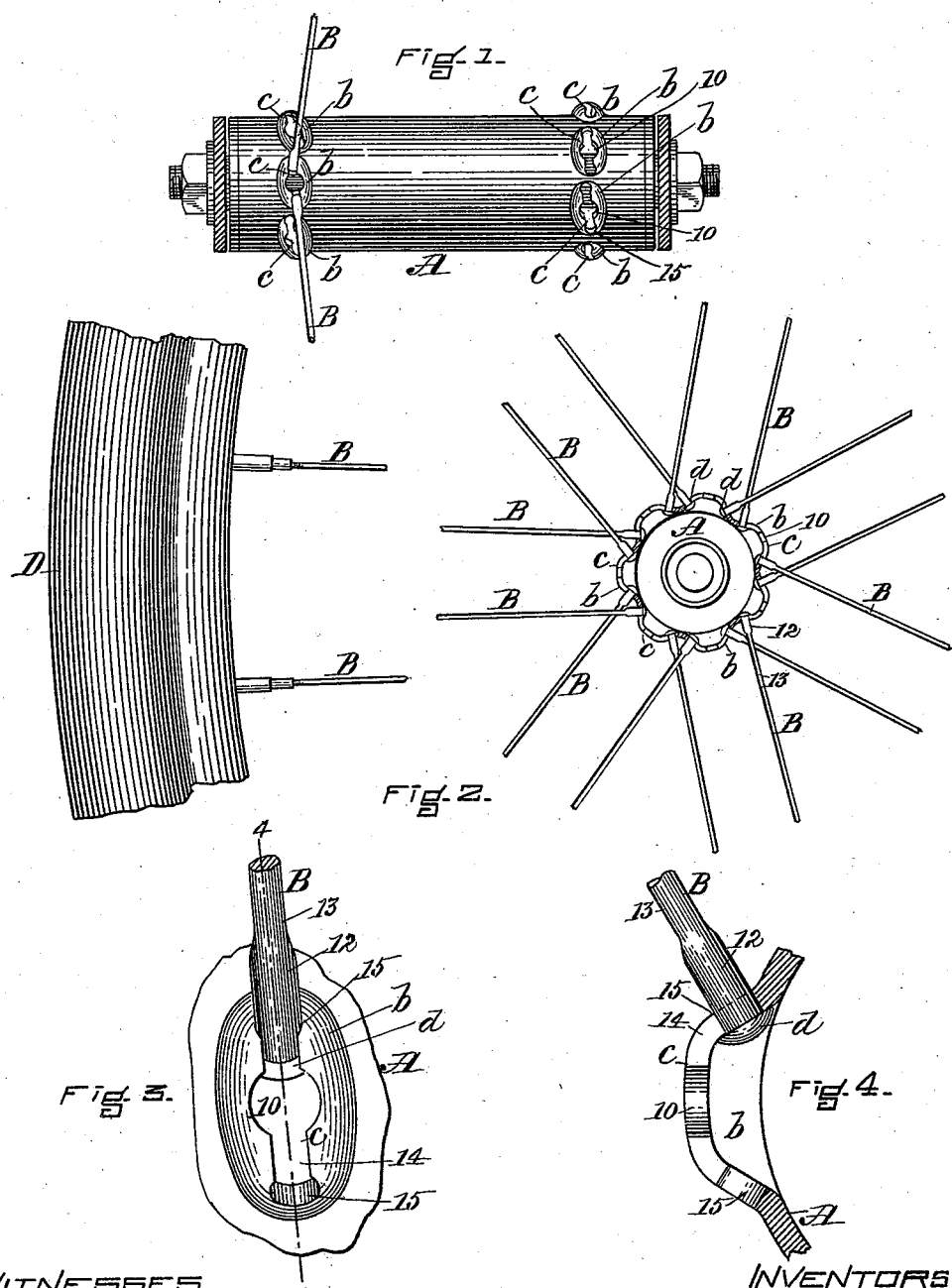

UNITED STATES PATENT OFFICE.

CHARLES E. McGLINCHEY AND CHARLES W. HEDENBERG, OF NEEDHAM, MASSACHUSETTS.

TUBULAR HUB FOR BICYCLE OR OTHER WHEELS.

SPECIFICATION forming part of Letters Patent No. 549,740, dated November 12, 1895.

Application filed July 30, 1895. Serial No. 557,618. (No model.)

*To all whom it may concern:*

Be it known that we, CHARLES E. McGLINCHEY and CHARLES W. HEDENBERG, citizens of the United States, residing at Needham, in the county of Norfolk and State of Massachusetts, have invented certain Improvements in Tubular Hubs for Bicycle or other Wheels, of which the following is a full, clear, and exact description, reference being had to the accompanying drawings, making part of this specification, in which—

Figure 1 is a plan of a bicycle-wheel hub constructed in accordance with our invention. Fig. 2 is a vertical section of the hub, showing the spokes and a portion of the rim of the wheel to which said hub is applied. Fig. 3 is an enlarged detail showing one of the hollow bosses and its keyhole or buttonhole spoke-slot with one of the spokes in place therein. Fig. 4 is a vertical section on the line 4 4 of Fig. 3.

Our invention relates to tubular hubs for bicycle and other wheels, and has for its object to improve the method of securing the inner ends of the tangentially-disposed spokes to the hub, whereby the necessity of bending the ends of the spokes at the points where they are connected with the hub is avoided, which is objectionable, as the operation of bending crystallizes the metal and renders the spoke liable to break at its junction with the hub.

To this end our invention consists in certain novel features of construction and combinations of parts, as hereinafter described and specifically claimed.

In the said drawings, A represents our improved hub, which consists of a short tube, preferably composed of steel, and provided at each end with a series of hollow bosses or protuberances $b$, struck up by means of suitable dies and arranged at equal distances apart, as shown in Figs. 1 and 2. These bosses, which are preferably of oval or elongated shape, as shown, are each provided with a keyhole or buttonhole slot $c$, the central circular portion 10 of which is adapted to admit the heads $d$ of the two spokes B, which fit within said slot and extend from the opposite ends of the same to the rim D of the wheel, as shown in Fig. 2.

The diameter of the spokes B is slightly enlarged for a short distance under the head, as at 12, Figs. 3 and 4, and after passing the head $d$, through the opening 10, the spoke is pushed in until the smaller portion 13 is in line with one of the narrow portions 14 of the slot, when it is pushed over to the end of said slot, which is provided with a circular enlargement 15 of sufficient diameter to accommodate the thick portion 12 of the spoke, which is then drawn up until the head $d$ takes a square even bearing on all sides against the inner surface of the hollow boss $b$, as shown in Fig. 4, when the spoke will assume its proper angular or tangential position and will extend in a direct line without a bend from the head $d$ to the rim D of the wheel.

The slots $c$ are inclined to the axis of the hub to facilitate the crossing of the spokes without the necessity of bending them out of a straight line, and the ends of the said slots are preferably provided with the circular enlargements 15, as above described, as they serve to hold the ends of the spokes securely in place, so that if they should become slightly loose they cannot work their way toward the central opening 10 and escape therefrom, for the reason that the thick portion 12 of the spoke cannot pass through the narrow portion 14 of the slot.

The above-described hub is of simple construction and can be produced at a trifling expense, while it presents many advantages over tubular hubs as hitherto constructed for the reason that no bending of the spokes is required, and by reason of the shape of the interior surface of the hollow boss the head of the spoke, when its shank is inclined at a proper angle to the hub, is enabled to take a square and even bearing on all sides against said inner surface, so that the spoke can extend in a direct line from said hub to the rim of the wheel, and by thus avoiding the necessity of bending the spoke all liability of its breaking at its junction with the hub is avoided.

We are aware that wheel-hubs have been constructed with hollow annular flanges provided with spoke-receiving openings for the reception of headed bolts screwed into the inner ends of the spokes, and also that hollow spoke-rings have been placed upon the ends of tubular wheel-hubs and provided with circular openings through which the spokes were passed from the interior of said rings. We are also aware that hubs have been provided with flanges at a right angle to the axis, having buttonhole slots for the reception of the headed ends of wire spokes, the latter being bent at a right angle at the points where they enter the slots in the flanges. We therefore make no claim to any of these devices or constructions.

What we claim as our invention, and desire to secure by Letters Patent, is—

1. In a wheel, a tubular hub provided with a series of separate and independent concavo-convex bosses or protuberances arranged around its circumference and having button-hole slots extending across the centers of their tops for the reception of the headed ends of spokes tangentially disposed to the hub, the under surfaces of the heads at the inner ends of said tangentially disposed spokes taking a square even bearing on all sides against the inner surfaces of the said concavo-convex protuberances, substantially as set forth.

2. A tubular hub for bicycle and other wheels provided with a series of separate and independent concavo-convex bosses or protuberances arranged around its circumference and inclined to the axis of the hub, each of said bosses having a button-hole slot extending across the center of its top, in combination with direct spokes tangentially disposed to the hub and terminating in heads adapted to engage said slots and take a square even bearing on all sides at the ends of the slots against the inner surfaces of said protuberances when the spokes are stretched tangentially with respect to the hub, substantially as set forth.

3. In a wheel, a tubular hub provided at each end with a series of separate and independent concavo-convex bosses or protuberances arranged around its circumference and each having a slot $c$, extending across the center of its top for the reception of the headed ends of the spokes, said slots being each provided with a central enlargement 10, and two narrow portions 14, each of the latter having a circular enlargement 15, at its end for the reception of the enlarged portion of the spoke under the head, substantially as described.

Witness our hands this 27th day of July, A. D. 1895.

CHARLES E. McGLINCHEY.
CHARLES W. HEDENBERG.

In presence of—
P. E. TESCHEMACHER,
J. O. SHAW, Jr.